United States Patent [19]
Minder

[11] 3,838,616
[45] Oct. 1, 1974

[54] TOOL CARRIER
[76] Inventor: Emile Minder, 11a, chemin des Vidollets, 1214 Vernier-Geneva, Switzerland
[22] Filed: May 29, 1973
[21] Appl. No.: 364,329

[30] Foreign Application Priority Data
June 20, 1972 Switzerland.......................... 9243/72

[52] U.S. Cl. .................................... 82/36 A, 29/96
[51] Int. Cl. ......................... B23b 29/00, B26d 1/00
[58] Field of Search .... 82/35, 36, 37; 29/96, 105 R, 29/105 A

[56] References Cited
UNITED STATES PATENTS
1,028,805  6/1912  Wood .................................... 82/36
1,075,450  10/1913 Van Osdel .............................. 29/96
1,720,820  7/1929  Cole....................................... 29/96
2,360,137  10/1944 Jennings ................................. 29/96
3,367,220  2/1968  Copeland................................ 82/35

FOREIGN PATENTS OR APPLICATIONS
270,313  8/1950  Switzerland...................... 29/105 A Primary Examiner—Harrison L. Hinson
Attorney, Agent, or Firm—Young & Thompson

[57] ABSTRACT

The invention concerns a tool-carrier which comprises an adjustment device for the advance of its tool. This adjustment device comprises located within a bore of the tool-carrier, a movable cylinder connected at one of its ends, through driving means of this cylinder to a driving member, and connected at its other end to the tool. This adjustment device comprises further locking means of the cylinder into the tool-carrier.

4 Claims, 3 Drawing Figures

TOOL CARRIER

The present invention has for its object the provision of a tool-carrier particularly for machine tools such as for example a lathe or a hobbing machine and more particularly for a copying lathe, using commercially available hard metal cutting tips.

Up to now the adjustment of the advance of the tool is made only by displacing the tool-carrier slide of the machine or other means provided for the same purpose which can have only very difficultly a precision which gives satisfaction. The object of the present invention is to enable one to realise easily a very high precision adjustment.

The tool-carrier according to the present invention is characterized by the fact that it comprises an adjusting device for the advance of the tool which comprises, located within the bore of the tool-carrier, a moving cylinder connected at one of its ends through driving means of this cylinder to a driving member, and connected at its other end to the tool; and by the fact that it comprises locking means of the cylinder on the tool-carrier.

The attached drawing shows schematically and by way of example one embodiment of the tool carrier according to the invention.

Figure 1:
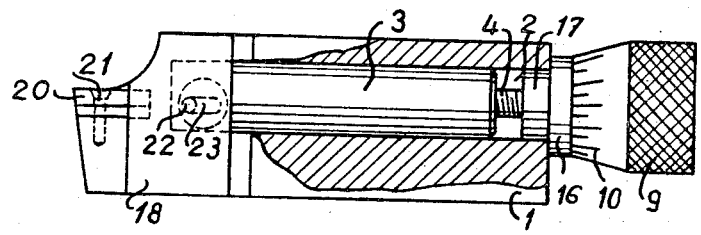
FIG. 1 is an elevation in partial cross section of it.

The tool carrier 1 shown in FIG. 1 has a bore 2 in which is located a full cylinder 3 having a diameter corresponding to the diameter of the bore 2.

By corresponding diameter it is intended that the diameter of the cylinder 3 is such that it can be moved within the bore 2 with slight friction.

Figure 2:
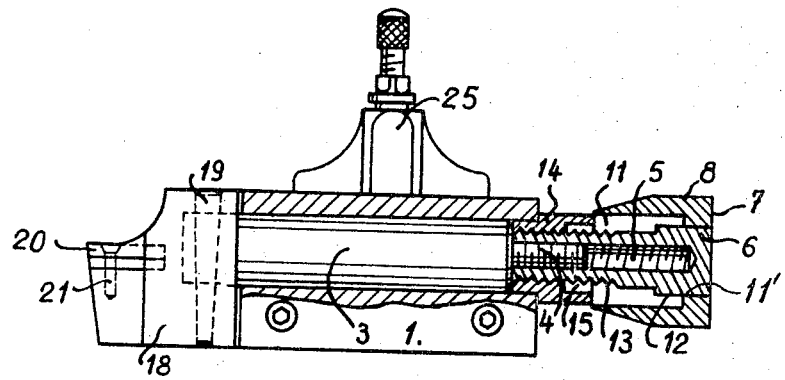
FIG. 2 is an elevation in partial cross section of another face of the tool-carrier.

The cylinder 3 has an axial threaded rod 4 rigidly connected to one of its ends, and engaged by the other end of rod 4 in a tapping 5 of the body 6 of the driving member 7 (FIG. 2).

This driving member 7 has an outside portion 8 comprising a cylindrical portion provided with gripping formation 9 and a frusto conical portion carrying graduations 10.

The driving member 7 has further a cylindrical bore 11 at one end and a smaller cylindrical bore 11' at the other end.

The body 6 has a cylindrical portion 12 driven into the bore 11'.

The body 6 has further on a portion of its length a thread 13 having a pitch slightly greater than the pitch of the threaded rod 4.

This thread 13 co-operates with a tap of a ring 14 comprising a cylindrical bore 15. The ring 14 has a portion 16 having an outside diameter corresponding to the diameter of the cylindrical bore 11 of the driving member 7. The driving member slides on the portion 16 of the ring 14 with slight frictions.

This ring 14 has further a portion 17 driven into the bore 2.

The ring 14 comprises further a coaxial tapping intended to receive the thread 13 of the body 6 of the driving member 7.

This tapping of the ring 14 constitutes with the tapped rod 4, the tap 5 and the thread 13 of the driving member 7, driving means of the cylinder 3 in the bore 2 of the tool carrier 1.

A tool 18 is connected at the other end of this cylinder 3 by means of the conical pin 19 driven in a hole of the cylinder 3.

The tool 18 carries a removable cutting tip commercialy used.

The tool-carrier 1 comprises further locking means of the cylinder 3 into the tool-carrier, comprising a stud 22 fixed at one of its ends perpendicularly to the cylinder 3 and movable transversely of its axis through an elongated hole 23 provided in the tool carrier 1.

These locking means comprise further a tightening nut 24 threaded onto the stud 22.

Figure 3:
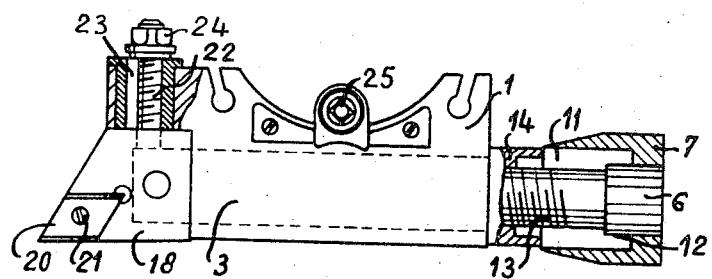
FIG. 3 is a plan view partially in cross section of the tool carrier.

The tool-carrier described is particularly intended to be mounted on a tool-carrier device for a lathe such as the one described in Swiss patent No. 236,622 and shown in FIGS. 2 and 3 thereof.

The adjustment of the height of the tool-carrier 1 with respect to the work piece is effected by means of a regulating device 25 of the tool-carrier device for the lathe whereas the advance of the cutting-tool 18 is controlled by angular displacement of the driving member 7.

Driving member 7 displaces axially on the portion 16 of the ring 14, through the thread 13 of the body 6 co-operating with the tap of the ring 14.

The angular displacement of this driving member 7 is transmitted by the tap 5 of the body 6 to the threaded rod 4.

Thanks to the pitch of the tap 5, which is less then that of the thread 13, the displacement of the cylinder 3 driven by the threaded rod 4 is less than the axial displacement of the driving member 7. The displacement of the cylinder 3 is equal to the value of the difference between the pitches of the threads 13 and 4.

One obtains therefore a very precise adjustment of the advance of the tool 18 which is fast on the cylinder 3.

After having displaced the cutting-tool 18 by the value displayed on the graduated portion 10 of the driving member 7, one locks the cylinder 3 on the tool-carrier 1 by means of the tightening nut 24 which enables one to apply strongly the tool against one face of the tool-carrier.

The length of the elongated hole 23 is a function of the maximum possible displacement of the cylinder 3 with respect to the tool-carrier 1.

Such a tool-carrier, comprising a very fine adjustment device of the advance of the cutting-tool, is used with advantage on the tool carrier slide of a copying lathe where it complements the precision adjustments possibilities.

I claim:

1. A tool carrier comprising a body having a cylindrical bore therein, a cylinder slidable in said bore and carrying a tool at one end, an externally screw-threaded rod carried by and coaxial with the other end of the cylinder, a rotatable driving member having internal screw threads that mate with said rod and external screw threads that mate with internal screw threads fixed with said body, said external and internal screw threads of said driving member being in different pitch, and means for locking said cylinder in axially adjusted positions relative to said body.

2. A tool carrier as claimed in claim 1, said driving member having an internal cylindrical surface that slides over an external cylindrical surface fixed to said body.

3. A tool carrier as claimed in claim 1, said locking means comprising a stud fixed at one of its ends to said cylinder and perpendicular to said cylinder and passing through an elongated hole in said body, and a tightening nut threaded onto said stud for tightening against said body.

4. A tool carrier as claimed in claim 1, said driving member having peripherally spaced graduations thereabout.

* * * * *